United States Patent
Herzi et al.

(10) Patent No.: US 9,977,730 B2
(45) Date of Patent: May 22, 2018

(54) SYSTEM AND METHOD FOR OPTIMIZING SYSTEM MEMORY AND INPUT/OUTPUT OPERATIONS MEMORY

(71) Applicant: Dell Products, LP, Round Rock, TX (US)

(72) Inventors: Dirie N. Herzi, Leander, TX (US); Munif Farhan, Round Rock, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 235 days.

(21) Appl. No.: 14/707,397

(22) Filed: May 8, 2015

(65) Prior Publication Data
US 2016/0328317 A1    Nov. 10, 2016

(51) Int. Cl.
| | |
|---|---|
| *H05K 7/10* | (2006.01) |
| *G06F 13/00* | (2006.01) |
| *G06F 13/28* | (2006.01) |
| *G06F 12/02* | (2006.01) |
| *G06F 13/24* | (2006.01) |
| *G06F 12/0875* | (2016.01) |

(52) U.S. Cl.
CPC ........ *G06F 12/023* (2013.01); *G06F 12/0875* (2013.01); *G06F 13/24* (2013.01); *G06F 2212/1044* (2013.01); *G06F 2212/452* (2013.01)

(58) Field of Classification Search
CPC ........... G06F 12/023; G06F 2212/1044; G06F 12/0223; G06F 12/0284; G06F 2009/45583; G06F 3/061; G06F 3/0631; G06F 3/0644

USPC ........ 710/104, 301; 711/E12.013, 147, 170, 711/153, 173
See application file for complete search history.

(56) References Cited

U.S. PATENT DOCUMENTS

| | | | | |
|---|---|---|---|---|
| 5,644,732 A | * | 7/1997 | Davidson | G06F 12/0669 710/104 |
| 6,353,874 B1 | * | 3/2002 | Morein | G06F 12/0802 711/100 |
| 6,574,708 B2 | | 6/2003 | Hayter et al. | |
| 6,724,390 B1 | * | 4/2004 | Dragony | G06F 12/023 345/543 |
| 6,775,757 B1 | * | 8/2004 | Greicar | G06F 9/44521 711/170 |
| 7,103,735 B2 | | 9/2006 | Iyer | |
| 8,145,852 B2 | * | 3/2012 | Jeong | G06F 13/1663 711/150 |
| 8,176,255 B2 | | 5/2012 | Knebel | |

(Continued)

*Primary Examiner* — Faisal M Zaman
(74) *Attorney, Agent, or Firm* — Larson Newman, LLP (57) ABSTRACT

An information handling system including a first memory to store data as a system memory for operations of a first processor in the information handling system, a second memory to store data as a cache memory for input/output operations of a second processor, and an interrupt handler. The interrupt handler is configured to monitor an input/output bus to determine whether a number of the input/output operations is above a first threshold level, if the number of the input/output operations is above the threshold level, to re-allocate a portion of the first memory from the first processor to the second processor, to monitor the utilization of the first memory to determine whether a utilization level is above a second threshold level, and if the utilization level is above the second threshold level, to re-allocate a portion of the second memory from the second processor to the first processor.

20 Claims, 4 Drawing Sheets

(56) References Cited

U.S. PATENT DOCUMENTS

| | | | |
|---|---|---|---|
| 9,026,695 B2* | 5/2015 | Wu .......................... | G06F 5/10 |
| | | | 710/3 |
| 9,274,839 B2* | 3/2016 | Schluessler ......... | G06F 9/45558 |
| 9,317,427 B2* | 4/2016 | DeSota ............... | G06F 12/0646 |
| 2002/0116576 A1* | 8/2002 | Keshava ................... | G06F 3/14 |
| | | | 711/118 |
| 2004/0019715 A1* | 1/2004 | Apfeldorfer .............. | G06F 5/10 |
| | | | 710/57 |
| 2004/0030854 A1* | 2/2004 | Qureshi ............... | G06F 9/4411 |
| | | | 711/170 |
| 2005/0050282 A1* | 3/2005 | Vantalon ............... | G01S 19/215 |
| | | | 711/147 |
| 2009/0284537 A1* | 11/2009 | Hong ....................... | G06T 1/60 |
| | | | 345/522 |
| 2014/0047251 A1* | 2/2014 | Kottilingal ........... | G06F 1/3296 |
| | | | 713/320 |
| 2014/0365735 A1* | 12/2014 | Kuwamura ........... | G06F 8/4442 |
| | | | 711/144 |
| 2015/0227586 A1* | 8/2015 | Li ........................ | G06F 9/5027 |
| | | | 707/769 |
| 2015/0324131 A1* | 11/2015 | Loh ....................... | G06F 3/0685 |
| | | | 711/117 |

\* cited by examiner

SYSTEM AND METHOD FOR OPTIMIZING SYSTEM MEMORY AND INPUT/OUTPUT OPERATIONS MEMORY

FIELD OF THE DISCLOSURE

The present disclosure generally relates to system and method for optimizing system memory and input/output operations memory.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

An information handling system can include a system memory to store data associated with operations executed by a processor within the information handling system. The information handling system can also include a different memory that can be utilized by another processor to cache data associated with an input/output operation prior to the input/output operation being executed.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer, such as desktop or laptop, tablet computer, mobile device (such as a personal digital assistant (PDA) or smart phone), server (such as blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

In an embodiment, an information handling system includes multiple processors that can each have a memory allocated to the processor for storing data associated with operations to be executed by that processor. While the processors are executing different operations, an interrupt handler in the information handling system can periodically provide an SMI to the processors to determine how busy each processor is and/or the performance level of the processor and its associated memory.

The interrupt handler can determine whether the memories are being over utilized, under utilized, or the like. The interrupt handler can then re-allocate a portion of the under utilized memory to the processor associated with the over utilized memory to increase the performance of that processor. In an embodiment, the interrupt handler can continually provide the SMIs to the processors to determine the utilization of the memories, and re-allocate portions of the memories as needed to optimize both processors in the information handling system.

Figure 1:
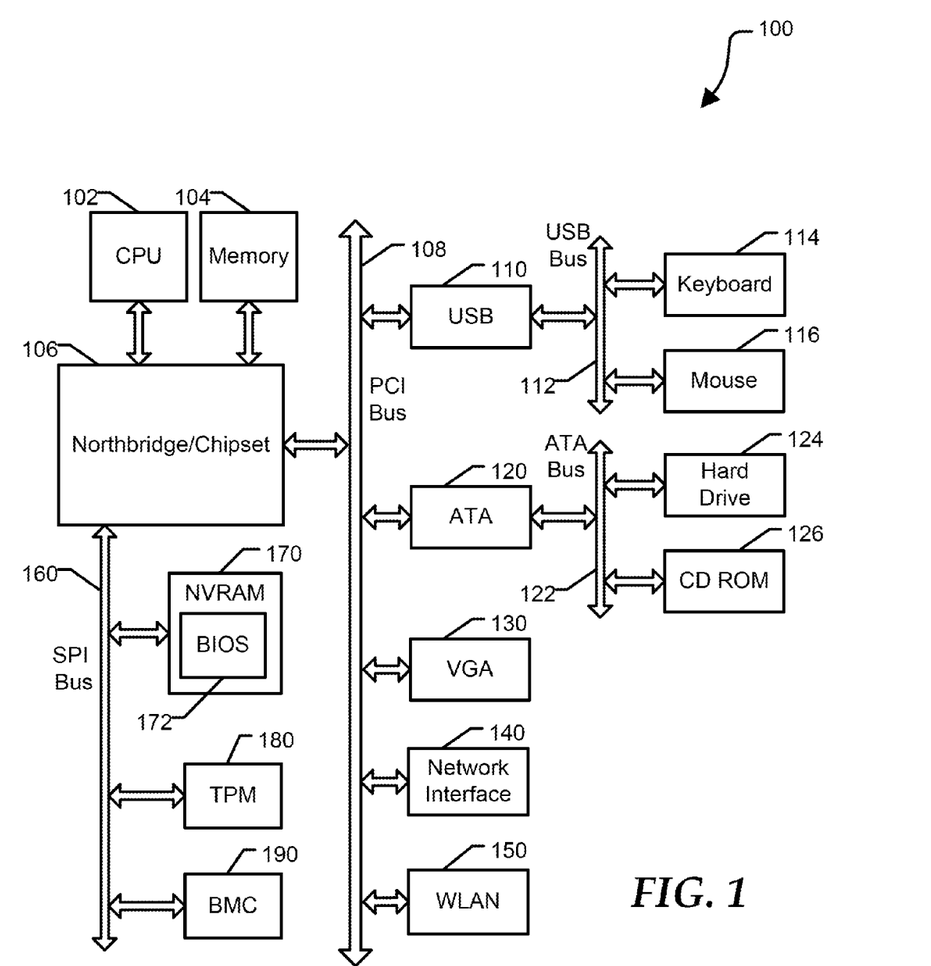
FIG. 1 is a block diagram of an information handling system according to at least one embodiment of the present disclosure.

FIG. 1 illustrates an information handling system 100 including a processor 102, a memory 104, a northbridge/chipset 106, a peripheral component interconnect (PCI) bus 108, a universal serial bus (USB) controller 110, a USB 112, a keyboard device controller 114, a mouse device controller 116, an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a non-volatile random access memory (NVRAM) 170 for storing a basic input/output system (BIOS) 172, a trusted platform module (TPM) 180, and a baseboard management controller (BMC) 190. Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple central processing units (CPUs) and redundant bus controllers. One or more components can be integrated together. For example, portions of northbridge/chipset 106 can be integrated within CPU 102.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and operating systems to interact with devices, such as a keyboard, a display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

In an embodiment, the BIOS 172 can be substantially compliant with one or more revisions of the UEFI specification. The UEFI standard replaces the antiquated personal computer BIOS system found in some older information handling systems. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that the disclosed systems and methods can be implemented at substantially any information handling system having firmware.

Figure 2:
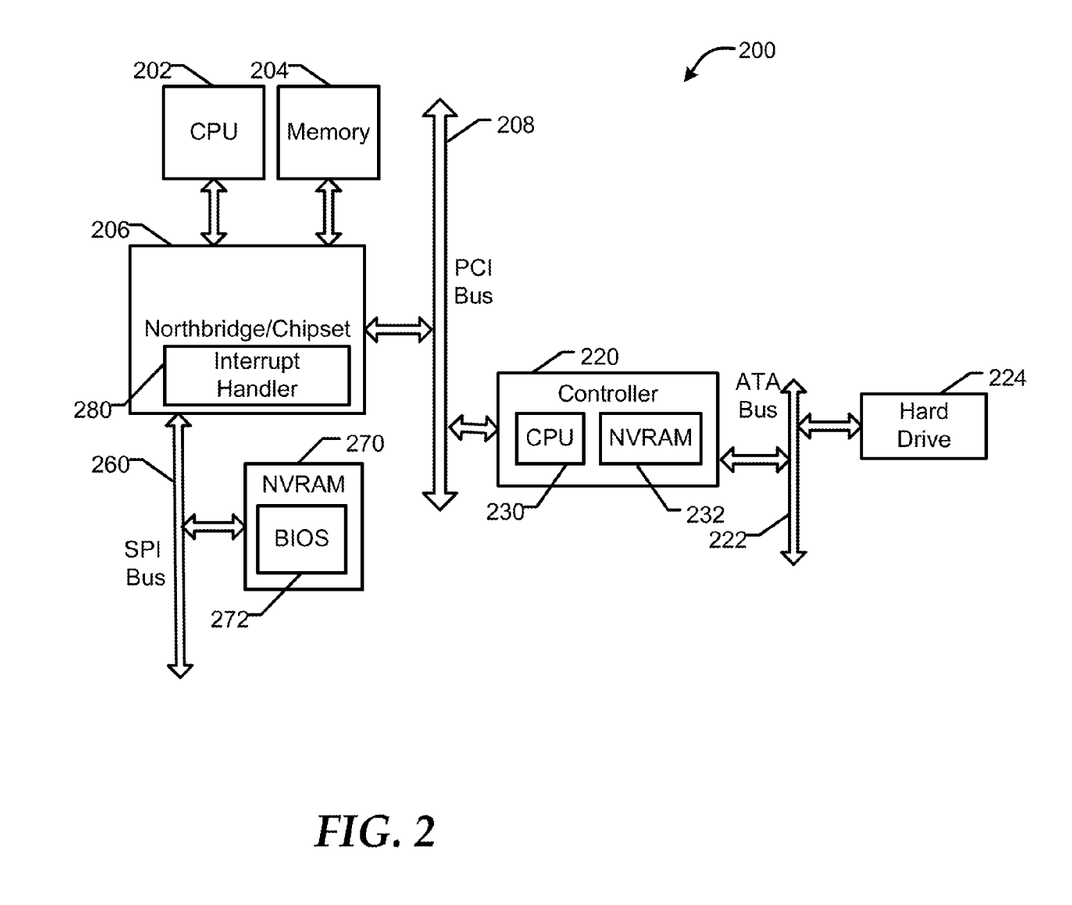
FIG. 2 is a block diagram of a portion of the information handling system according to at least one embodiment of the present disclosure.

FIG. 2 illustrates an information handling system 200 including a CPU 202, a memory 204, a chipset 206, a memory 270, a controller 220, and a hard drive 224. In an embodiment, the controller 220 can be the ATA bus controller 120 of FIG. 1 can be a peripheral component interconnect express (PCIe) controller, or any other type of memory controller to execute input/output (I/O) operations associated with the hard drive 224. In an embodiment, the controller 220 includes a processor 230 and a memory 232, such as a non-volatile memory. In an embodiment, the memory 270 can store for storing a basic input/output system (BIOS) 272. The components of the information handling system 200 can communicate with one another via different buses including, but not limited to, a SPI bus 260, a PCI bus 208, and an ATA bus 222. One skilled in the art would recognize that these buses are exemplary communication buses and that the buses could be interchanged with substantially similar buses without changing the scope of the disclosure.

During start-up of the information handling system 200, the BIOS 272 can enter a DXE boot operation to launch different applications to be executed in the processor 202, the chipset 206, the processor 230, or the like. For example, the execution of the firmware of the BIOS 272 can launch a system management interrupt (SMI) handler 280, which can communicate with the processor 202, the chipset 206, the controller 220, or the like. During the start-up, the BIOS 272 can allocate the memory 204 as a system memory, which can be utilized by the processor 202 to store data associated operations executed in the processor 202. Similarly, the BIOS 272 can allocate the memory 232 to the processor 230, which in turn can cache data associated with I/O operations received by the processor.

Upon the start-up being completed, the processors 202 and 230 can begin to perform different operations assigned to them via the chipset 206 or any other means. In different embodiments, the number of operations to be performed by the processors 202 and 230 can vary depending on the information handling system, the current state of the information handling system, or the like. In an embodiment, the utilization of the memory 204 can be affected by the number of operations to be executed by or currently being executed in the processor 202. In an embodiment, the utilization of the memory 232 can be affected by the number of I/O operations to be executed by or currently being executed in the processor 230. As used herein, the utilization of the memory is the amount of, or percentage of, the memory storing data at any particular point in time.

While the processors 202 and 230 are executing different operations, the interrupt handler 280 can periodically provide an SMI to the processors to determine how busy each processor is and/or the performance level of the processor and its associated memory 204 or 232. In an embodiment, the interrupt handler 280 can read machine specific registers (MSRs) or chipset specific registers in the chipset 206 to determine whether the memory 204 is being under utilized, over utilized, or the like. The interrupt handler 280 can also monitor an I/O bus, such as the PCI bus 208, provide a command to the processor 230, or the like to determine how many I/O operations the processor is executing. The interrupt handler 280 can also determine whether storage capacity of the memory 232 is being exceeded by the amount of data in the I/O operations of the processor 230 or the like.

If the interrupt handler 280 receives a response from the processor 230 that the memory 232 is being over utilized, such that the memory does not have enough storage space for the data associated with I/O operations to be performed by the processor, the interrupt handler 280 can determine that a number of the I/O operations in the processor 230 is above a threshold level. The interrupt handler 280 can then determine whether the memory 204 is being under utilized, such that there is a portion of the memory not being used by the processor 202. If interrupt handler 280 determines that the number of the I/O operations is above the threshold level and the memory 204 is being under utilized, the interrupt handler 280 can re-allocate a portion of the memory 204 from the processor 202 to the processor 230. For example, an application in the BIOS 272 can unplug the memory 204 from the information handling system 200, and the under utilized portion of the memory 204 can be hidden from the processor 202 when the memory 204 is reconnected by the application defining the portion of the memory as a system resource. The interrupt handler 280 can then provide a SMI command to the processor 230 indicating that additional memory (the portion of memory 204) has been allocated for use by the processor 230. The processor 230 of controller 220 can then enter a new mode of operation identifying the portion of memory 204 as a memory available to cache data associated I/O operations prior to the I/O operations being executed.

As stated above, the interrupt handler 280 can also read the MSRs to determine whether memory 204 allocated to processor 202 is being over utilized. If the interrupt handler 280 determines that the utilization level of memory 204 is above a threshold, the interrupt handler 280 can then determine whether the memory 232 is being under utilized. The interrupt handler 280 can also determine the types of operations that are causing the memory 204 to be over utilized. For example, the memory 204 could be over utilized as a result of a high data payload workload for the processor 202. In this example, the processor 202 can have high data payload workload if the number of operations is low, but each individual operation has a large amount of data to be stored in the memory 204. If the interrupt handler 280 determines that the memory 204 is being over utilized in response to the processor 202 having a high data payload workload, the interrupt handler 280 can re-allocate a portion of memory 232 from the processor 230 to the processor 202 as block storage for the processor 202. In this example, the processor 202 can identify the portion of memory 232 re-allocated to processor 202 as a separate memory from the memory 204, but can utilize the re-allocated portion for storage of data associated with operations to be executed in the processor.

In an embodiment, the processor 202 can have a high frequency access workload in response to the processor 202 having a lot of operations to execute and the data associated with these operations is exceeding the total available space of the memory 204. If the interrupt handler 280 determines that the utilization level of the memory 204 is above the threshold as a result of a high frequency access workload for the processor 202, the portion of the memory 232 can be re-allocated as a virtual memory extension of the memory 204. In this embodiment, the re-allocated portion of memory 232 can appear as part of memory 204 to the processor 202.

Thus, the interrupt handler 280 can monitor the I/O operations of the processor 230 within the controller 220, and the operations of the processor 202 to determine whether the memories 204 and 232 are being over utilized, under utilized, or the like. The interrupt handler 280 can then re-allocate a portion of the under utilized memory to the processor associated with the over utilized memory to increase the performance of that processor. In an embodiment, the interrupt handler 280 can continually provide SMIs to the processors 202 and 230 to determine the utilization of the memories 204 and 232, and re-allocate portions of the memories as needed to optimize both processors in the information handling system 200.

Figure 3:
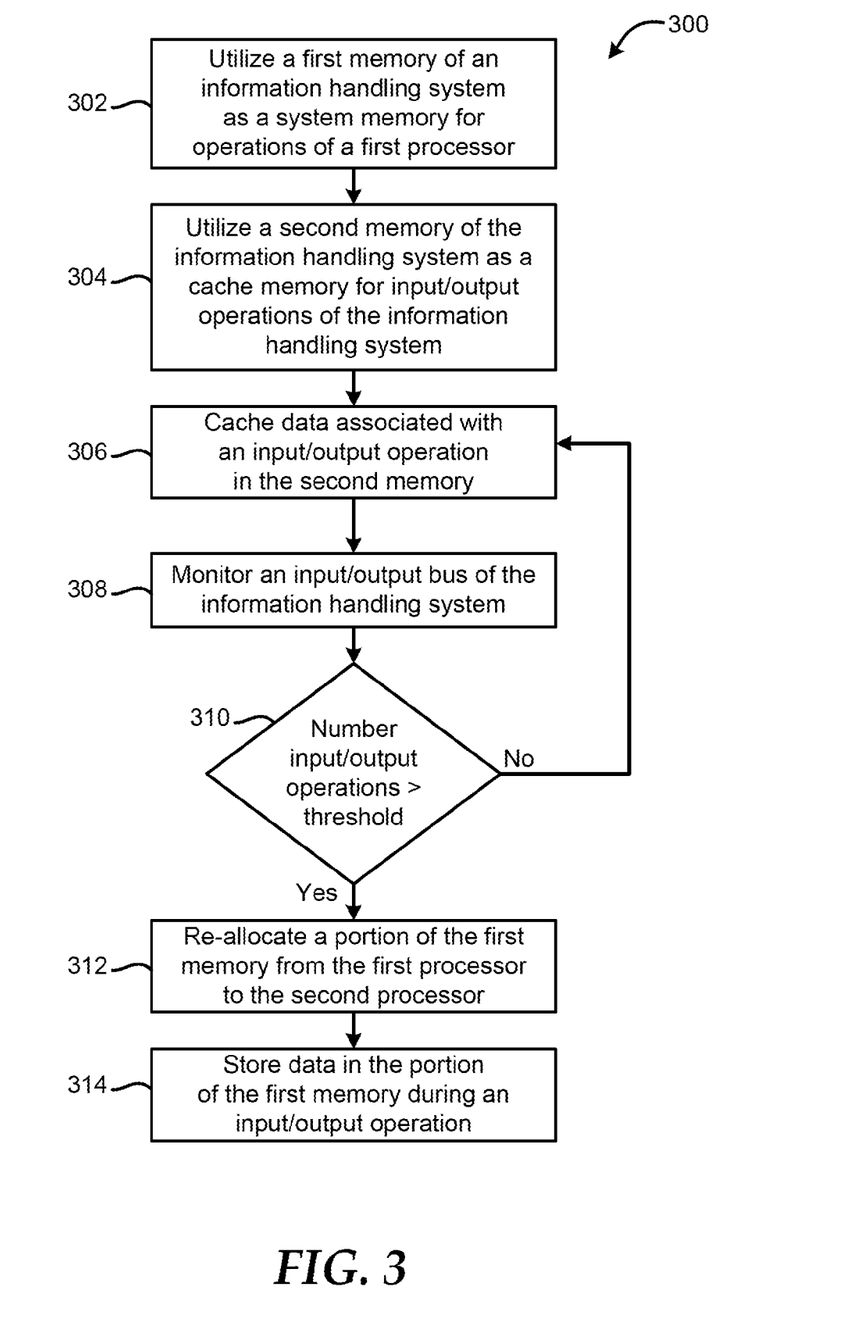
FIG. 3 is a flow diagram of a method for re-allocating a portion of a system memory in the information handling system as part of an input/output memory of the information handling system according to at least one embodiment of the present disclosure.

FIG. 3 illustrates a method 300 for re-allocating a portion of a system memory in the information handling system as part of an input/output memory of the information handling system according to at least one embodiment of the present disclosure. At block 302, a first memory of an information handling system is utilized as a system memory for operations of a first processor in the information handling system. A second memory of the information handling system is utilized as a cache memory for input/output operations of a second processor in the information handling system at block 304. In an embodiment, the second memory and the second processor can both be located within a memory controller of the information handling system. In this embodiment, the second processor can perform input/output operations provided to the memory controller. At block 306, the data associated with the input/output operations can be cached in the second memory prior to the related operation being executed.

At block 308, an input/output bus of the information handling system is monitored. In an embodiment, the monitoring can include an interrupt handler of a basic input/output system of the information handling system periodically providing a system management interrupt. In this embodiment, the interrupt handler can then send a command to the second processor in response to the system management interrupt. The second processor can then determine whether a storage amount of the second memory is being exceeded by an amount of data associated with the input/output operations for the second processor in response to the command, and the second processor can provide this information to the interrupt handler.

At block 310 a determination is made whether a number of the input/output operations is above a first threshold level. If the number of the input/output operations is not above the threshold level, the flow continues as stated above at block 306. If the number of the input/output operations is above the threshold level, a portion of the first memory is re-allocated from the first processor to the second processor at block 312. At block 314, data associated with an input/output operation, such as a write operation, is stored in the portion of the first memory.

Figure 4:
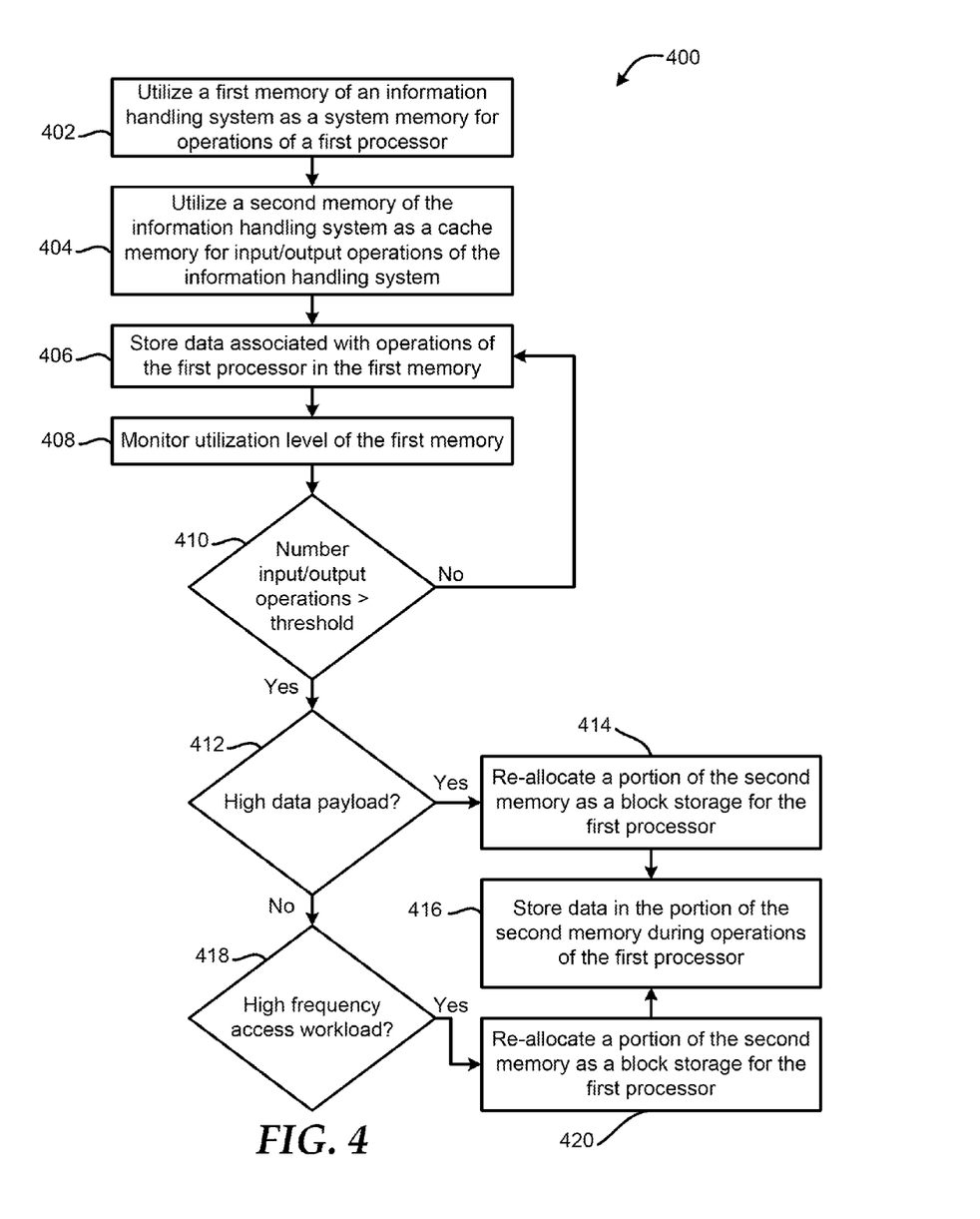
FIG. 4 is a flow diagram of a method for re-allocating a portion of an input/output memory in the information handling system as part of the system memory of the information handling system according to at least one embodiment of the present disclosure.

FIG. 4 is a flow diagram of a method for re-allocating a portion of an input/output memory in the information handling system as part of the system memory of the information handling system according to at least one embodiment of the present disclosure. While the methods of FIGS. 3 and 4 are discussed separately, one skilled in the art would recognize that the methods can be performed as a continuous flow from one method to the next, can be performed at substantially the same time, or the like. Used herein, at substantially the same time can include that the operations completely overlap in time, partially overlap in time, or the like.

At block 402, a first memory of an information handling system is utilized as a system memory for operations of a first processor in the information handling system. A second memory of the information handling system is utilized as a cache memory for input/output operations of a second processor in the information handling system at block 404. In an embodiment, the second memory and the second processor can both be located within a memory controller of the information handling system. In this embodiment, the second processor can perform input/output operations provided to the memory controller. At block 406, the data associated with the operations of the first processor can be stored in the second memory prior.

At block 408, a utilization of the first memory is monitored. At block 410, determination is made whether a utilization level of the first memory is above a threshold level. In an embodiment, the utilization of the first memory can be monitored in different ways. For example, an interrupt handler of the information handling system can periodically providing a system management interrupt, and can determine a value of a machine specific register of the first processor of the information handling system in response to the system management interrupt. The interrupt handler can then determine the utilization level of the first memory based on the value of the machine specific register. Additionally, the interrupt handler can monitor the utilization of the first memory by determining a value of chipset specific registers.

If the utilization level is not above the threshold level, the flow can continue as stated above at block 406. If the utilization level is above the threshold level, at determination can be made whether the utilization level is above the threshold as a result of a high data payload workload for the first processor at block 412. If the utilization level is above the threshold as a result of a high data payload workload for the first processor, a portion of the second memory from the second processor to the first processor as a block storage for the first processor separate from the first memory at block 414. At block 416, data can be stored in the portion of the second memory during operations of the first processor.

If utilization level is not above the threshold as a result of a high data payload workload for the first processor, a determination can be made whether the utilization level is above the threshold as a result of a high frequency access workload for the first processor at block 418. If the utilization level is above the threshold as a result of a high frequency access workload for the first processor, the portion of the second memory can be re-allocated as a virtual memory extension of the first memory at block 420, and the flow continues as stated above at block 416.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a first memory to store data as a system memory for operations of a first processor in the information handling system;
   a second memory to store data as a cache memory for input/output operations of a second processor in the information handling system; and
   an interrupt handler of a basic input/output system configured to communicate with the first and second processors, the interrupt handler to monitor an input/output bus of the information handling system to determine whether a number of the input/output operations is above a first threshold level, if the number of the input/output operations is above the first threshold level then to re-allocate a portion of the first memory from the first processor to the second processor, to determine a value of a machine specific register of the first processor of the information handling system, to determine a utilization level of the first memory based on the value of the machine specific register, to determine whether the utilization level is above a second threshold level, if the utilization level is above the second threshold level then to determine whether a type of operation that causes utilization of the first memory to be above the second threshold level is a first or a second type of operation, to re-allocate a portion of the second memory from the second processor to the first processor as a separate physical memory for the first processor from the first memory in response to the first type of operation, and to re-allocate the portion of the second memory as a virtual memory extension of the first memory that appears to the first processor as part of the first memory in response to the second type of operation.

2. The information handling system of claim 1, wherein the second memory is located within a memory controller of the information handling system.

3. The information handling system of claim 1, wherein the first type of operation is a high data payload workload for the first processor.

4. The information handling system of claim 1, wherein the second type of operation is a high frequency access workload for the first processor.

5. The information handling system of claim 1, the interrupt handler further to periodically providing a system management interrupt, to send a command to the second processor in response to the system management interrupt, and to determine whether a storage amount of the second memory is being exceeded by an amount of data associated with the input/output operations for the second processor in response to the command.

6. The information handling system of claim 1, the interrupt handler further to periodically provide a system management interrupt to determine the value of the machine specific register of the first processor of the information handling.

7. The information handling system of claim 1, the interrupt handler further to determine a value of chipset specific registers, and to determine the utilization level of the first memory based on the value of the machine specific register.

8. A method comprising:
utilizing a first memory of an information handling system as a system memory for operations of a first processor in the information handling system;
utilizing a second memory of an information handling system as a cache memory for input/output operations of a second processor in the information handling system;
monitoring an input/output bus of the information handling system to determine whether a number of the input/output operations is above a first threshold level;
if the number of the input/output operations is above the threshold level, then re-allocating a portion of the first memory from the first processor to the second processor;
determining a value of a machine specific register of the first processor of the information handling system;
determining a utilization level of the first memory based on the value of the machine specific register;
determining whether the utilization level is above a second threshold level; and
if the utilization level is above the second threshold level, then determining whether a type of operation that causes utilization of the first memory to be above the second threshold level is a first or second type of operation;
if the type of operation is the first type of operation, then re-allocating a portion of the second memory from the second processor to the first processor as a separate physical memory for the first processor from the first memory in response to the first type of operation; and
if the type of operation is the second type of operation, then re-allocating the portion of the second memo as a virtual memory extension of the first memory that appears to the first processor as part of the first memory in response to the second type of operation.

9. The method of claim 8, wherein the second memory is located within a memory controller of the information handling system.

10. The method of claim 8, wherein the first type of operation is a high data payload workload for the first processor.

11. The method of claim 8, wherein the second type of operation is a high frequency access workload for the first processor.

12. The method of claim 8, wherein monitoring the input/output bus of the information handling system comprises:
periodically providing a system management interrupt;
sending a command to the second processor in response to the system management interrupt; and
determining whether a storage amount of the second memory is being exceeded by an amount of data associated with the input/output operations for the second processor in response to the command.

13. The method of claim 8, wherein monitoring the utilization of the first memory comprises:
periodically providing a system management interrupt to cause the value of the machine specific register of the first processor of the information handling system to be determined.

14. The method of claim 13, wherein monitoring the utilization of the first memory comprises:
determining a value of chipset specific registers; and
determining the utilization level of the first memory based on the value of the machine specific register.

15. A method comprising:
utilizing a first memory of an information handling system as a system memory for operations of a first processor in the information handling system;
utilizing a second memory of an information handling system as a cache memory for input/output operations of a second processor in the information handling system;
determining a value of a machine specific register of the first processor of the information handling system;
determining a utilization level of the first memory based on the value of the machine specific register;
determining whether the utilization level is above a second threshold level; and
if the utilization level is above the second threshold level, then:
hiding a portion of the second memory from the second processor when the second memory is reconnected by an application defining the portion of the memory as a system resource;
determining whether a type of operation that causes utilization of the first memory to be above the second threshold level is a first or second type of operation;
if the type of operation is the first type of operation, then re-allocating the portion of the second memory from the second processor to the first processor as a separate physical memory for the first processor from the first memory in response to the first type of operation; and
if the type of operation is the first type of operation, then re-allocating the portion of the second memory as a virtual memory extension of the first memory that appears to the first processor as part of the first memory in response to the second type of operation.

16. The method of claim 15, wherein the second memory is located within a memory controller of the information handling system.

17. The method of claim 15, wherein the first type of operation is a result of a high data payload workload for the first processor.

18. The method of claim 15, wherein the second type of operation is a high frequency access workload for the first processor.

19. The method of claim 15, wherein monitoring the utilization of the first memory comprises:
periodically providing a system management interrupt to cause the value of the machine specific register of the first processor of the information handling system to be determined.

20. The method of claim 19, wherein monitoring the utilization of the first memory comprises:
determining a value of chipset specific registers; and
determining the utilization level of the first memory based on the value of the machine specific register.

* * * * *